(12) United States Patent
Guo et al.

(10) Patent No.: US 11,629,937 B2
(45) Date of Patent: Apr. 18, 2023

(54) DEVICE AND METHOD OF ANTI-UNMANNED AERIAL VEHICLE BASED ON MULTI-CAMERA TRACKING AND POSITIONING

(71) Applicant: SHENZHEN INSTITUTE OF INFORMATION TECHNOLOGY, Shenzhen (CN)

(72) Inventors: Sen Guo, Shenzhen (CN); Xianyi Ren, Shenzhen (CN); Tao Hu, Shenzhen (CN)

(73) Assignee: SHENZHEN INSTITUTE OF INFORMATION TECHNOLOGY, Shenzhen (CN)

( * ) Notice: Subject to any disclaimer, the term of this patent is extended or adjusted under 35 U.S.C. 154(b) by 764 days.

(21) Appl. No.: 16/497,439

(22) PCT Filed: Apr. 11, 2018

(86) PCT No.: PCT/CN2018/082657
§ 371 (c)(1),
(2) Date: Sep. 24, 2019

(87) PCT Pub. No.: WO2018/201868
PCT Pub. Date: Nov. 8, 2018

(65) Prior Publication Data
US 2021/0302131 A1    Sep. 30, 2021

(30) Foreign Application Priority Data
May 2, 2017   (CN) .......................... 201710300094.8

(51) Int. Cl.
*F41H 11/02*   (2006.01)
*F41G 3/14*    (2006.01)
(Continued)

(52) U.S. Cl.
CPC ............... *F41H 11/02* (2013.01); *F41G 3/14* (2013.01); *G06V 20/13* (2022.01); *G06V 20/52* (2022.01);
(Continued)

(58) Field of Classification Search
CPC ........... F41H 11/02; F41G 3/14; G06V 20/52; B64C 2201/12
See application file for complete search history.

(56) References Cited

U.S. PATENT DOCUMENTS 9,996,079 B2 *   6/2018   Magy ................... G08G 5/0013
10,495,420 B2 *  12/2019  Blache .................... F42B 5/313
(Continued)

FOREIGN PATENT DOCUMENTS

AU   2020203089 B2 *   11/2021   ............. F41H 11/02
CN   105989612 A      10/2016
(Continued)

*Primary Examiner* — Benjamin P Lee
(74) *Attorney, Agent, or Firm* — Robert L. Stearns; Dickinson Wright, PLLC

(57) ABSTRACT

A device and a method of anti-unmanned aerial vehicle based on multi-camera tracking and positioning, including: a bracket, defined a center, a circumference surrounding the center and a central axis passing through the center; at least three cameras, the cameras are evenly distributed and inclined outwardly on the circumference of the bracket, and center lines of view of the cameras forms an inverted cone; a directional antenna, configured to be arranged on the central axis of the bracket; an electromagnetic module, configured to be coupled to the directional antenna; a pan-tilt, connected to the center of the bracket and configured to drive the bracket to rotate; and a control unit, configured to control the pan-tilt to track a target and lock on (Continued)

to the target according to the video image provided by the cameras, such that the electromagnetic module is manipulated to attack the target.

9 Claims, 5 Drawing Sheets

(51) Int. Cl.
*G06V 20/13* (2022.01)
*G06V 20/52* (2022.01)
*B64C 39/02* (2023.01)

(52) U.S. Cl.
CPC ........ *B64C 39/024* (2013.01); *B64C 2201/12* (2013.01)

(56) References Cited

U.S. PATENT DOCUMENTS

| | | | |
|---|---|---|---|
| 10,739,451 B1* | 8/2020 | Parker | H04K 3/45 |
| 10,760,879 B2* | 9/2020 | Stark | F41H 13/0093 |
| 10,907,940 B1* | 2/2021 | Parker | G06N 20/00 |
| 11,064,184 B2* | 7/2021 | Choi | G03B 15/006 |
| 11,126,204 B2* | 9/2021 | Abramov | B64C 39/024 |
| 11,187,499 B1* | 11/2021 | Fortney | H04K 3/42 |
| 11,385,659 B2* | 7/2022 | Levin | G01S 13/867 |
| 11,401,047 B2* | 8/2022 | Gury | G05D 1/102 |
| 11,410,299 B2* | 8/2022 | Turov | G06T 7/248 |
| 2007/0144392 A1* | 6/2007 | Wood | H05H 1/52 376/121 |
| 2017/0144756 A1* | 5/2017 | Rastgaar Aagaah | B64C 39/024 |
| 2017/0192089 A1* | 7/2017 | Parker | F41H 11/02 |
| 2018/0080747 A1* | 3/2018 | Nishikata | H01S 3/10 |
| 2018/0162530 A1* | 6/2018 | Klein | B64D 1/02 |
| 2020/0108922 A1* | 4/2020 | Smith | B64D 47/04 |
| 2020/0108923 A1* | 4/2020 | Smith | B64D 47/08 |
| 2020/0108925 A1* | 4/2020 | Smith | B64D 1/16 |
| 2020/0108926 A1* | 4/2020 | Smith | B64C 39/024 |
| 2020/0167938 A1* | 5/2020 | Matzner | G06V 20/52 |
| 2020/0231054 A1* | 7/2020 | Resnick | B64D 1/12 |
| 2020/0284557 A1* | 9/2020 | Madhav | B64C 39/024 |
| 2021/0025975 A1* | 1/2021 | Seeber | G01S 13/86 |
| 2021/0350162 A1* | 11/2021 | Miller | H04N 7/181 |
| 2021/0405654 A1* | 12/2021 | Ulun | G06T 7/70 |

FOREIGN PATENT DOCUMENTS

| | | |
|---|---|---|
| CN | 106452658 A | 2/2017 |
| CN | 107071364 A | 8/2017 |
| EP | 1580518 A1 | 9/2005 |

* cited by examiner

DEVICE AND METHOD OF ANTI-UNMANNED AERIAL VEHICLE BASED ON MULTI-CAMERA TRACKING AND POSITIONING

CROSS-REFERENCE TO RELATED APPLICATION

This application is a 35 U.S.C. § 371 national stage application of PCT Application Serial No. PCT/CN2018/082657 filed on Apr. 11, 2018, which claims priority to Chinese Patent Application Ser. No. CN20170300094.8, filed on May 2, 2017, each of which are hereby incorporated by reference in their entireties.

TECHNICAL FIELD

The present application relates to a device of anti-unmanned aerial vehicle, and more specifically to a device and a method of anti-unmanned aerial vehicle based on multi-camera tracking and positioning.

BACKGROUND TECHNOLOGY

In recent years, the unmanned aerial vehicle (UAV) market has grown rapidly. With the large-scale research and development and production of many manufacturers, the popularity of commercial UAV is getting higher and higher. However, the supervision to the UAV, especially the UAV without license in China is still in a blank state, and the level of harassment and threats caused by the UAV without license has increased. The UAV without license can infringed on the privacy of individuals/families and cause the injuries of people and objects, which can further jeopardize national security. There are flight accidents and injury incident caused by the UAV without license a few days ago. It can be seen that the UAV without license hides huge security risks. In the face of the blank of the UAV without license supervision, only by adopting the corresponding technical means to counteract, the air safety can be guaranteed.

At present, the common anti-UAV equipment includes the anti-UAV electromagnetic gun, which is similar in shape to a rifle with the gun body being an electromagnetic pulse transmitter and the barrel being a transmitting antenna (many are spiral). The specific working principle thereof is: the operator aims the UAV without license using the anti-UAV gun and transmits a beam of directional electromagnetic pulse interference wave with high power to interfere with the electronic system of the UAV without license, then the communication navigation system of the UAV without license is out of order and the UAV without license lose control to land on the ground or even crash. The existing equipment of this type has a low level of automation, and the target tracking, aiming and shooting need to be operated by the operator, and the operator needs special training to master the skills of aiming and shooting, and the operator also needs to remain alert at all times, which requires a higher energy and physical to the operator.

SUMMARY

An object of the present application is to solve the above problems of the prior art, and providing a device of anti-unmanned aerial vehicle based on multi-camera tracking and positioning, which can greatly improve the level of automation of tracking, aiming and shooting.

The present application provides a device of anti-unmanned aerial vehicle based on multi-camera tracking and positioning aimed to the above technical problems, including:

a bracket, on which a center, a circumference surrounding the center and a central axis passing through the center are defined;

at least three cameras, wherein the cameras are evenly distributed and inclined outwardly arranged on the circumference of the bracket, and center lines of view of the cameras forms an inverted cone;

a directional antenna, configured to be arranged on the central axis of the bracket;

an electromagnetic module, configured to be coupled to the directional antenna;

a pan-tilt, connected to the center of the bracket and configured to drive the bracket to rotate; and a control unit, configured to control the pan-tilt to track a target and lock on to the target according to the video image provided by the cameras, so as to manipulate the electromagnetic module to attack the target.

In some embodiments, fields of view of the cameras are all rectangular, and overlapping areas shared by the cameras correspond to the central axis of the bracket, when the target enters the overlapping areas and is imaged in all cameras, it means that the target is aligned by the directional antenna.

In some embodiments, the larger a radius of the circumference defined by the bracket is, the smaller an angle between the central line of view of the camera and the central axis defined by the bracket is.

In some embodiments, the bracket is configured to be a cross-shaped bracket, and the number of the cameras is four.

In some embodiments, a gunshot of the electromagnetic gun is set within two hundred meters.

In some embodiments, the cameras are configured to be high definition cameras with infrared function.

In some embodiments, the directional antenna is configured to be a yagi antenna.

In some embodiments, the pan-tilt is configured to be an omnidirectional pan-tilt.

In some embodiments, the control unit comprises: an image analysis module, configured to analyze the video images provided by the cameras, and to control the pan-tilt and/or electromagnetic module according to an analysis result; a communication module, configured for external communication; and a power supply module, configured for providing a working power.

The present application further provides a method of anti-unmanned aerial vehicle based on multi-camera tracking and positioning being implemented by using the device of anti-unmanned aerial vehicle above mentioned aimed to the above technical problems, including the steps of:

photographing a monitoring airspace via the cameras and sending collected video images to the control unit in real time;

sending a command to the pan-tilt to control the pan-tilt to rotate and track an unmanned aerial vehicle, after the control unit analyzes and finds the unmanned aerial vehicle entering the monitoring airspace; and sending a command to the electromagnetic module via the control unit when the unmanned aerial vehicle enters the overlapping field of view of all the cameras, that is the unmanned aerial vehicle is imaged on all the cameras; and transmitting electromagnetic waves of a specific frequency from the electromagnetic module via the directional antenna to attack the unmanned aerial vehicle.

Compared with the prior art, the device and the method of anti-unmanned aerial vehicle based on multi-camera tracking and positioning of the present application arranges a plurality of cameras evenly distributed on the circumference, the pan-tilt on the center and the directional antenna on the central axis via skillfully using the bracket, and combines with the cameras, the pan-tilt and the electromagnetic module coupled to the directional antenna via the control unit, which can greatly improve the level of automation of tracking, aiming and shooting.

Figure 1:
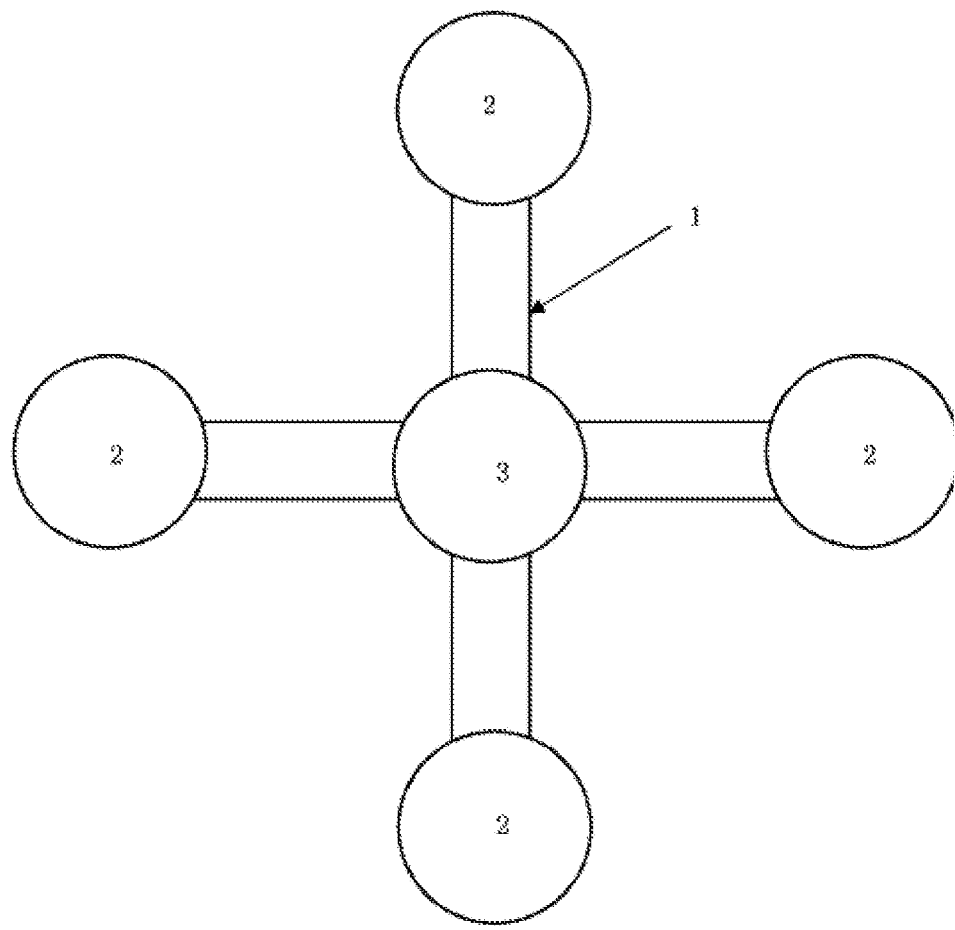
FIG. 1 is a schematic view showing the outline of a bracket of a device of anti-unmanned aerial vehicle based on multi-camera tracking and positioning of the present application.

The reference numerals are as follows:
10 electromagnetic gun; 1 bracket; 2 camera; 3 directional antenna; 4 electromagnetic control module; 5 pan-tilt; 6 control unit; 31, 32, 33, 34 monitoring areas; 310, 320, 330, 340 basic area; 301 first area; 302 second area; 303 third area; 304 fourth area; 305 fifth area; 306 sixth area; 307 seventh area; 308 eighth area; 309 ninth area.

DETAILED DESCRIPTION

The preferred embodiments of the present application are further described in detail below with reference to the drawings of the specification.

Figure 2:
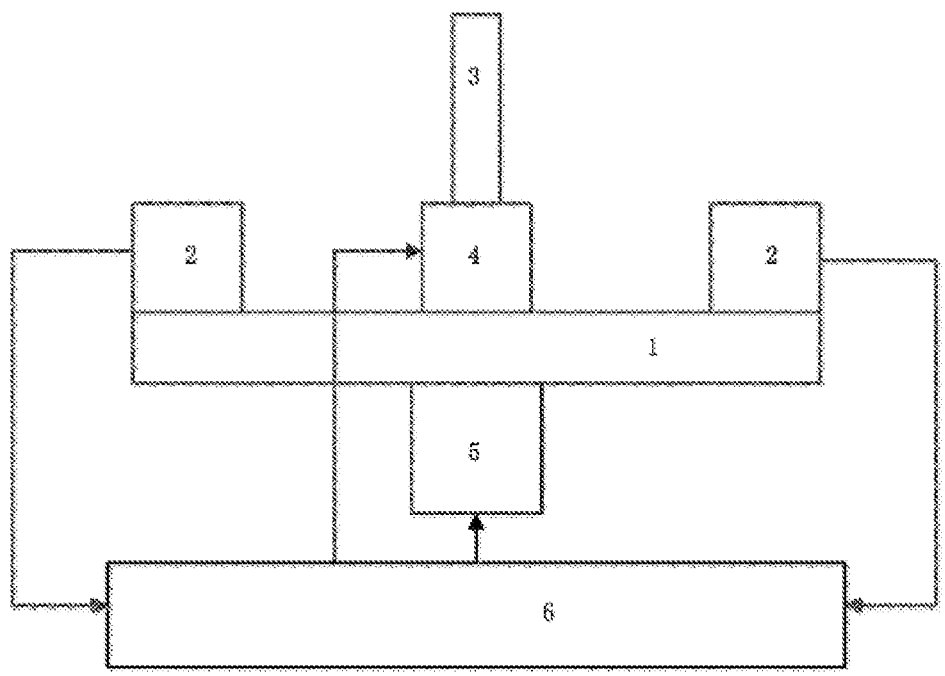
FIG. 2 is a schematic structural view of a device of anti-unmanned aerial vehicle based on multi-camera tracking and positioning of the present application.
Figure 3:
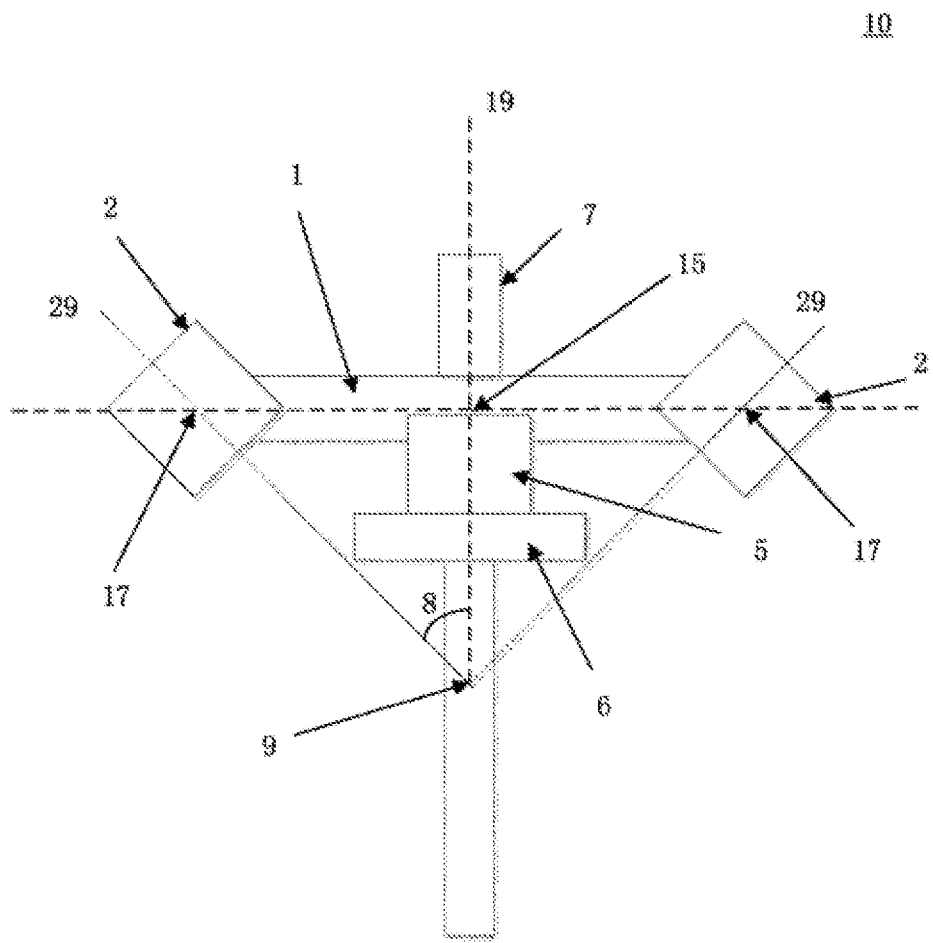
FIG. 3 is a schematic illustration of four cameras inclined outwardly on a device of anti-unmanned aerial vehicle based on multi-camera tracking and positioning of the present application.

Referring to FIGS. 1 to 3, FIG. 1 is a schematic view showing the outline of a bracket of a device of anti-unmanned aerial vehicle based on multi-camera tracking and positioning of the present application. FIG. 2 is a schematic structural view of a device of anti-unmanned aerial vehicle based on multi-camera tracking and positioning of the present application. FIG. 3 is a schematic illustration of four cameras inclined outwardly on a device of anti-unmanned aerial vehicle based on multi-camera tracking and positioning of the present application. The present application provides a device of anti-unmanned aerial vehicle 10 based on multi-camera tracking and positioning, which generally includes: a bracket 1, four cameras 2 mounted on the bracket 1, a directional antenna 3 and an electromagnetic module 4, a pan-tilt 5 cooperated with the bracket 1, and a control unit 6, wherein the combination of the directional antenna 3 and the electromagnetic module 4 may be collectively referred to as an electromagnetic gun 7.

The bracket 1 defines a center 15, a circumference surrounding the center 15, and a central axis 19 passing through the center 15. the bracket 1 is a cross-shaped bracket with four end points 17 which are equidistant from the center point (i.e., the center of the circle). The center point of the bracket 1 rests on the pan-tilt 5.

Each of the end points is mounted with a camera 2. The cameras 2 are inclined outwardly on the circumference of the bracket 1, and the center line 29 of view of the cameras 2 forms an inverted cone, that is, the apex 9 of the cone is back to the sky. Specifically, the larger the radius of the circumference defined by the bracket 1 is, the smaller the angle 8 between the central line 29 of view of the camera 2 and the central axis defined by the bracket 1 is.

The directional antenna 3 is disposed on the central axis defined by the bracket 1, that is, the central line of the directional antenna 3 is overlapped with the central axis 19. The electromagnetic module 4 is coupled to the directional antenna 3. In the present embodiment, the electromagnetic module 4 is disposed under the directional antenna 3.

The control unit 6 includes: an image analysis module configured for analyzing video images provided by the cameras 2, and then controlling the pan-tilt 5 and/or the electromagnetic module 4 according to the analysis result; a communication module configured for external communication; and a power supply module configured for providing working power. Specifically, the four cameras 2 are connected to the control unit 6 via a video line, the electromagnetic module 4 is connected to the control unit 6 via a control line, and the pan-tilt 5 is connected to the control unit 6 via a control line.

In this embodiment, the camera 2 selects an high definition camera with an infrared function. The directional antenna 3 uses an Yagi antenna. The electromagnetic module 4 is capable of transmitting electromagnetic waves of a set frequency via the directional antenna 3. The pan-tilt 5 selects an omnidirectional pan-tilt, and the inner the omnidirectional pan-tilt includes two motors, which are respectively responsible for the rotation of the pan-tilt in two vertical coordinate directions (for example, up and down and left and right).

Figure 4:
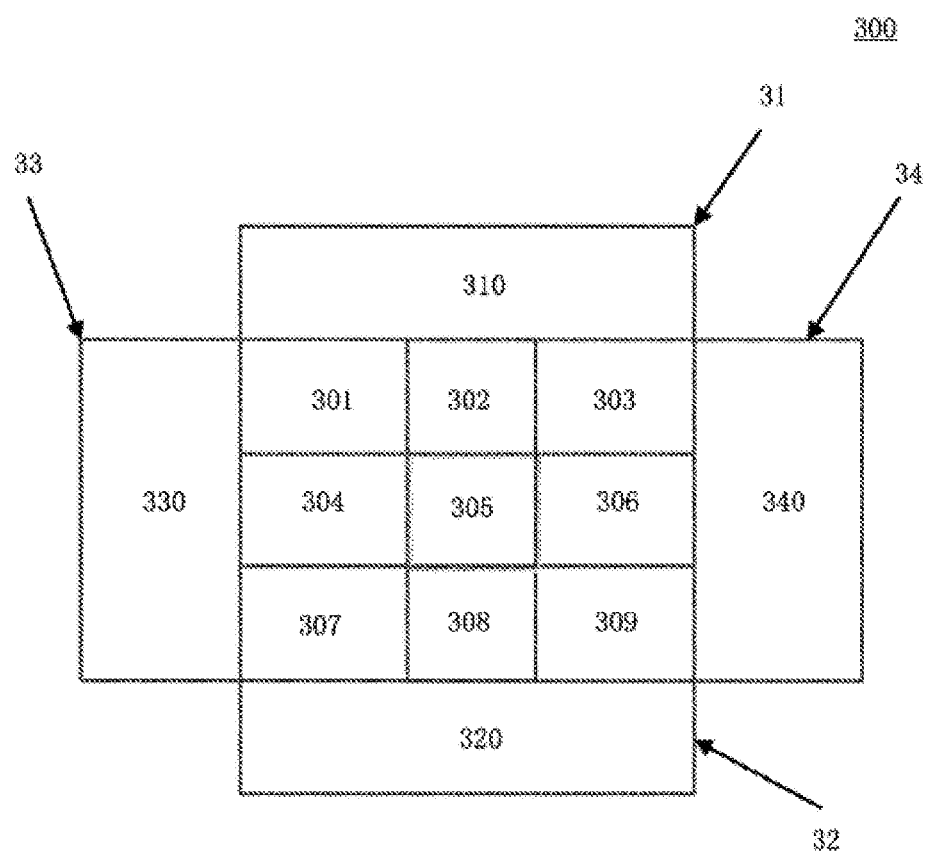
FIG. 4 is a schematic illustration of the monitoring area of four cameras in a device of anti-unmanned aerial vehicle based on multi-camera tracking and positioning of the present application.

Referring to FIG. 4, FIG. 4 is a schematic illustration of the monitoring area of four cameras in a device of anti-unmanned aerial vehicle based on multi-camera tracking and positioning of the present application. The fields of view of the four cameras 2 of the electromagnetic gun 10 corresponding to four rectangular monitoring areas 31, 32, 33, 34, respectively. Each of the monitoring areas 31, 32, 33, 34 has a basic area 310, 320, 330, 340 dedicated to its own camera 2. The area where the fields of view of at least two cameras 2 overlap includes: a first area 301, a second area 302, a third area 303, a fourth area 304, a fifth area 305, a sixth area 306, an seventh area 307, a eight area 308 and a ninth area 309.

The field of view 31 of the camera 2 located above is composed of the basic area 310, the first area 301, the second area 302, the third area 303, the fourth area 304, the fifth area 305, and the sixth area 306.

The field of view 32 of the camera 2 located below is composed of the basic area 320, the fourth area 304, the fifth area 305, the sixth area 306, the seventh area 307, the eighth area 308, and the ninth area 309.

The field of view 33 of the camera 2 located on the left side is composed of the basic area 330, the first area 301, the second area 302, the fourth area 304, the fifth area 305, the seventh area 307, and the eighth area 308.

The field of view 34 of the camera 2 on the right side is composed of the basic area 340, the second area 302, the third area 303, the fifth area 305, the sixth area 306, the eighth area 308, and the ninth area 309.

It can be seen that the fifth area 305 is an overlapping area shared by the fields of view of the four cameras 2, corresponding to the central axis of the bracket 1, that is, in theory, the extension of the central axis is penetrated the center of the fifth area 305. When the UAV enters the fifth area 305, it means that the UAV is aligned by the directional antenna 3.

It is worth mentioning that in the embodiment, the gunshot of the electromagnetic gun 10 is set within two hundred meters. The fifth area 305 of the four cameras 2 has an effective distance in a gunshot of 50 meters to 300 meters. In other embodiments, the set gunshot of the electromagnetic gun 10 can be appropriately expanded according to the needs of the actual application, for example, three hundred meters. Accordingly, the effective distance of the fifth area 305 of the four cameras 2 can be adjusted from 150 meters to 400 meters.

Figure 5:
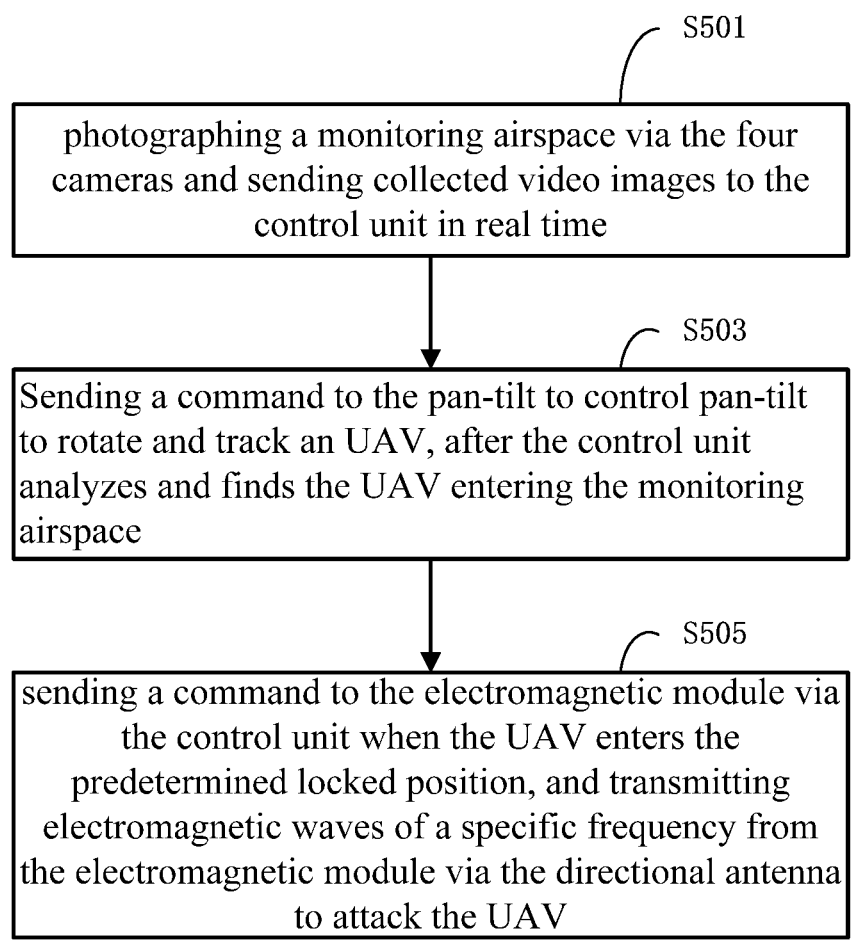
FIG. 5 is a flow chart showing the working principle of a device of anti-unmanned aerial vehicle based on multi-camera tracking and positioning of the present application.

Referring to FIG. 5, FIG. 5 is a flow chart showing the working principle of a device of anti-unmanned aerial vehicle based on multi-camera tracking and positioning of the present application. The working principle of the electromagnetic gun 10, that is, the method of a fully automatic anti-UAV implemented by the electromagnetic gun 10, generally includes:

Step S501: photographing a monitoring airspace via the four cameras 2 and sending collected video images to the control unit 6 in real time;

Step S503: sending a command to the pan-tilt 5 according to the current position of the UAV to control pan-tilt 5 to rotate and track an unmanned aerial vehicle and moving the imaging position of the UAV in the field of view toward the field of view overlapping area, after the control unit 6 analyzes and finds the unmanned aerial vehicle entering the monitoring airspace;

Step S505: sending a command to the electromagnetic module 4 via the control unit 6 when the unmanned aerial vehicle enters the predetermined locked position 305, that is the unmanned aerial vehicle is imaged on all the cameras 2; and transmitting electromagnetic waves of a specific frequency from the electromagnetic module 4 via the directional antenna 3 to attack the unmanned aerial vehicle.

That is to say, in combination with FIGS. 2 and 3, when it is found that there is an abnormal situation in the monitoring airspace 300, the control unit 6 first determines whether it is a UAV according to the shape and moving speed of the flying object; if it is determined to be a UAV, then according to the position of the UAV in FIG. 3, sending a control command to the pan-tilt 5 to control the pan-tilt 5 to rotate, and tracking is performed until the UAV is moved to the fifth area 305 at the imaging position in FIG. 3, the target being locked is completed; then, the control unit 6 can send a control command instructing the electromagnetic module 4 to transmit electromagnetic waves via the directional antenna 3 to attack the UAV to shoot down the UAV.

Compared with the prior art, the device of anti-unmanned aerial vehicle 10 based on multi-camera tracking and positioning of the present application arranges a plurality of cameras 2 evenly distributed on the circumference, the pan-tilt 5 on the center and the directional antenna 3 on the central axis via skillfully using the bracket 1, and combines with the cameras 2, the pan-tilt 5 and the electromagnetic module 4 coupled to the directional antenna 3 via the control unit 6, which can greatly improve the level of automation of tracking, aiming and shooting.

It is worth mentioning that, in the above embodiment, the four cameras 2 are evenly distributed on the circumference; in other embodiments, the number of cameras 2 evenly distributed on the circumference may also be three, four, five, and more than five. In the above embodiment, the four cameras 2 are carried by the cross-shaped bracket 1; in other embodiments, the bracket 1 for carrying the cameras 2 may also adopt other forms such as a roulette, that is, the structure of the bracket 1 can be various, as long as it is ensured that the cameras 2 can be evenly distributed on the same circumference, the center of the bracket 1 is connected to the pan-tilt 5, and the directional antenna 3 is disposed on the central axis of the circumference.

The above are only preferred embodiments of the present application, and are not intended to limit the embodiments of the present application. Those skilled in the art can make corresponding modifications in a very convenient manner according to the main idea and spirit of the present application. The scope of protection shall be subject to the scope of protection claimed by the claims.

What is claimed is:

1. A device of anti-unmanned aerial vehicle based on multi-camera tracking and positioning, comprising:
a bracket defining a center, a circumference surrounding the center, and a central axis passing through the center;
at least three cameras, wherein the cameras are evenly distributed and inclined outwardly arranged on the circumference of the bracket, and center lines of view of the cameras forms an inverted cone;
a directional antenna arranged on the central axis of the bracket;
an electromagnetic module coupled to the directional antenna;
a pan-tilt, connected to the center of the bracket and configured to rotate the bracket; and
a control unit, configured to control the pan-tilt to track a target and lock on to the target according to the video image provided by the cameras, so as to manipulate the electromagnetic module to attack the target.

2. The device of claim 1, wherein fields of view of the cameras are all rectangular, and overlapping areas shared by the cameras correspond to the central axis of the bracket, when the target enters the overlapping areas and is imaged in all cameras, it means that the target is aligned by the directional antenna.

3. The device of claim 1, wherein the larger a radius of the circumference defined by the bracket is, the smaller an angle between the central line of view of the camera and the central axis defined by the bracket is.

4. The device of claim 1, wherein the bracket is a cross-shaped bracket, and the number of the cameras is four.

5. The device of claim 4, wherein a gunshot of the electromagnetic gun is set within two hundred meters.

6. The device of claim 1, wherein the cameras are high definition cameras with infrared function.

7. The device of claim 1, wherein the directional antenna is a yagi antenna.

8. The device of claim 1, wherein the pan-tilt is an omnidirectional pan-tilt.

9. The device of claim 1, wherein the control unit comprises: an image analysis module, configured to analyze the video images provided by the cameras, and to control the pan-tilt and/or electromagnetic module according to an analysis result; a communication module, configured for external communication; and a power supply module, configured for providing a working power.

* * * * *